US012683408B2

(12) United States Patent
Schreck et al.

(10) Patent No.: US 12,683,408 B2
(45) Date of Patent: Jul. 14, 2026

(54) METHOD AND CONTROL APPARATUS FOR CONTROLLING LOAD FLOWS BETWEEN MULTIPLE ENERGY SYSTEMS

(71) Applicant: Siemens Aktiengesellschaft, Munich (DE)

(72) Inventors: Sebastian Schreck, Nuremberg (DE); Sebastian Thiem, Neustadt an der Aisch (DE); Arvid Amthor, Grabfeld OT Nordheim (DE); Stefan Jessenberger, Möhrendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 435 days.

(21) Appl. No.: 18/548,537

(22) PCT Filed: Feb. 9, 2022

(86) PCT No.: PCT/EP2022/053103
§ 371 (c)(1),
(2) Date: Aug. 31, 2023

(87) PCT Pub. No.: WO2022/184393
PCT Pub. Date: Sep. 9, 2022

(65) Prior Publication Data
US 2024/0162717 A1 May 16, 2024

(30) Foreign Application Priority Data
Mar. 5, 2021 (EP) ..................................... 21161052

(51) Int. Cl.
*H02J 13/12* (2026.01)
*H02J 3/466* (2026.01)

(52) U.S. Cl.
CPC .............. *H02J 3/466* (2020.01); *H02J 13/12* (2026.01)

(58) Field of Classification Search
CPC ........ H02J 3/466; H02J 13/00002; H02J 3/32; H02J 3/48; H02J 3/144; H02J 2203/10; Y02B 70/3225; Y04S 20/222
See application file for complete search history.

(56) References Cited

U.S. PATENT DOCUMENTS

2014/0375052 A1* 12/2014 Nielsen ................... F03D 9/255
290/44
2015/0286973 A1* 10/2015 Becher ............. G06Q 10/06313
705/7.23
(Continued)

FOREIGN PATENT DOCUMENTS

CN 111 062 513 4/2020 ............. C06Q 10/04
EP 3518369 A1 7/2019 ............. H02J 13/00

OTHER PUBLICATIONS

Search Report for International Application No. PCT/EP2022/053103, 12 pages.
(Continued)

*Primary Examiner* — Yuhui R Pan
(74) *Attorney, Agent, or Firm* — Slayden Grubert Beard PLLC

(57) ABSTRACT

Various embodiments include a method for controlling load flows between multiple energy systems via an electrical grid using a control apparatus common to the energy systems. Each of the energy systems can provide a power associated with a load flow at a grid node. The method may include: ascertaining first powers scheduled for the load flows using data from the energy systems, including information about a maximum power providable at the respective grid node by the respective energy system; determining an internal controlling power to the electrical grid and resolved with respect (Continued)

to the grid nodes on the basis of the ascertained scheduled first powers and grid boundary conditions provided for the electrical grid; taking account of the controlling power determined at the grid node by reducing or increasing the maximum powers providable at that grid node by the energy systems; ascertaining scheduled second powers on the basis of the reduced or increased maximum providable powers; and controlling the load flows according to the ascertained second powers.

14 Claims, 2 Drawing Sheets

(56)                    References Cited

U.S. PATENT DOCUMENTS

2016/0011577  A1 *    1/2016   Schwarz ................ G05B 15/02
                                                                  700/295
2017/0373509  A1 *   12/2017   Betzin ........................ H02J 3/28
2021/0036521  A1       2/2021   Chapotard et al.

OTHER PUBLICATIONS

Hooman Firoozi et al., "Optimized Operation of Local Energy Community Providing Frequency Restoration Reserve" IEEE Access, vol. 8.
Xingyu Yan et al., "Uncertainty analysis for day ahead power reserve quantification in an urban microgrid including PV genera-tors" *Renewable Energy*, vol. 106, Jun. 2017, pp. 288-297.

* cited by examiner

METHOD AND CONTROL APPARATUS FOR CONTROLLING LOAD FLOWS BETWEEN MULTIPLE ENERGY SYSTEMS

CROSS-REFERENCE TO RELATED APPLICATIONS

This application is a U.S. National Stage Application of International Application No. PCT/EP2022/053103 filed Feb. 9, 2022, which designates the United States of America, and claims priority to EP Application No. 21161052.2 filed Mar. 5, 2021, the contents of which are hereby incorporated by reference in their entirety.

TECHNICAL FIELD

The present disclosure relates to energy systems. Various embodiments of the teachings herein include systems and/or methods for controlling load flows between multiple energy systems.

BACKGROUND

Energy systems, for instance districts, municipalities, industrial plants, industrial buildings, office buildings and/or residential buildings, can exchange energy with one another, for example by means of an electricity grid (electrical grid), on a decentralized basis, that is to say locally. Energy systems in this case typically have one or more energy subsystems, for example a building. The energy subsystems each comprise multiple power plants intended to generate energy, to consume energy or to store energy.

Decentralization of the energy supply gives rise to the fundamental technical problem of efficiently distributing the local generated energy and, in particular, also consuming it locally. In other words, there is a need for technical regulation or control of the distribution of the energy that is generated, consumed and/or stored. Such control can be facilitated by means of a control apparatus of a local energy market platform.

In other words, a local energy market is technically realized by the local energy market platform, which forms a control apparatus. A local energy market platform/control apparatus such as this for exchanging electrical energy is known, for example, from the document EP 3518369 A1.

In principle, the local energy market platform facilitates the most efficient possible local distribution of the energy that is generated, consumed and/or stored in the complete system. Optimum control variables are ascertained using optimization methods (optimization). In other words, the technical control on which efficient energy distribution is based is represented by a target function on which optimization is based. The local energy market platform ascertains the technical values required for the control by solving the optimization problem, that is to say by extremizing the target function. In this case, the target function is associated with the complete system, that is to say with all energy systems and/or energy subsystems participating in energy exchange. The target function used is typically the total energy turnover, total emissions or total costs, or a weighted combination of said quantities.

In principle, the proportion of volatile, hard-to-predict supply of renewable energies, for example by way of photovoltaics and/or wind generators, and the proportion of decentralized consumers, for example by way of electric cars and/or heat pumps, is increasing.

This poses additional technical challenges for electrical grids and their grid operators. In particular, they need to react to short-term unforeseen generation or consumption fluctuations through the use of flexibility (controlling power) so that grid bottlenecks can be avoided and system stability (system frequency, voltage stability) is ensured. Since system frequency is the general quantity for European and other interconnected grids, it is necessary not only to ensure technical functionality in one's own energy system but also to continue to provide flexibility, that is to say controlling power, to overlaid grids or grid levels.

SUMMARY

The present disclosure describes improved systems and methods for controlling load flows between multiple energy systems via an electrical grid with regard to grid bottlenecks. For example, some embodiments include a method for controlling load flows between multiple energy systems (2) via an electrical grid (4) by means of a control apparatus (1) that is common to the energy systems (2), wherein each of the energy systems (2) can provide a power, associated with a load flow, at at least one grid node of the electrical grid (4), comprising: (S1) ascertaining first powers scheduled for the load flows on the basis of data transmitted from the energy systems (2) to the control apparatus (1) that include information about a maximum power providable at the respective grid node by the respective energy system; (S2) determining a controlling power that is internal to the electrical grid (4) and resolved with respect to the grid nodes on the basis of the ascertained scheduled first powers and on the basis of grid boundary conditions provided for the electrical grid (4); (S3) taking account of the controlling power determined at the grid node by appropriately reducing or increasing the maximum powers providable at that grid node by the energy systems (2); (S4) ascertaining scheduled second powers on the basis of the reduced or increased maximum providable powers; and (S5) controlling the load flows according to the ascertained second powers.

In some embodiments, additionally an external controlling power scheduled for an electrical grid that is superordinate to the electrical grid (4) is taken into account according to the internal controlling power.

In some embodiments, the external controlling power and/or a grid topology is transmitted to the control apparatus (1) by a control unit (3) of the superordinate grid.

In some embodiments, the first powers are ascertained by means of a first optimization method on the basis of a first target function by taking account of the grid boundary conditions, the first powers being the variables of the first target function.

In some embodiments, a sequence (42) of the energy systems (2), according to which sequence the providable powers at one of the grid nodes are reduced or increased, is stipulated on the basis of the first optimization.

In some embodiments, the second powers are ascertained by means of a second optimization method on the basis of a second target function by taking account of the grid boundary conditions, the second powers being the variables of the second target function.

In some embodiments, the grid boundary conditions comprise maximum line capacities for a load flow from one grid node to another grid node.

In some embodiments, the internal controlling power required at a grid node is ascertained from the maximum power capacity by means of a risk factor.

the data include information about a maximum connected load of the respective energy systems (2).

In some embodiments, the providable powers reduced or increased according to the determined controlling power are associated with a deferrable consumption, a deferrable generation and/or with a provision by an energy store of the respective energy system (2).

In some embodiments, the control apparatus (1) is used to control the load flows within a local energy market.

In some embodiments, it is carried out for a coming day, in particular for the next day.

In some embodiments, it is carried out repeatedly in time periods of one day, one hour, 15 minutes and/or 5 minutes.

As another example, some embodiments include a control apparatus (1) for controlling load flows between multiple energy systems (2) via an electrical grid (4), comprising a communication unit and a computing unit, wherein the communication unit is designed to receive data that include information about a maximum power providable at the respective grid node by the respective energy system (2), characterized in that the computing unit is designed to ascertain first powers scheduled for the load flows on the basis of the received maximum powers providable at the respective grid node; to determine a controlling power that is internal to the electrical grid (4) and resolved with respect to the grid nodes on the basis of the ascertained scheduled first powers and on the basis of grid boundary conditions provided for the electrical grid (4); to take account of the controlling power determined at the grid node by appropriately reducing or increasing the maximum powers providable at that grid node by the energy systems (2); to ascertain scheduled second powers on the basis of the reduced or increased maximum providable powers; and to control the load flows according to the ascertained second powers.

In some embodiments, the control apparatus is in the form of a local energy market platform.

BRIEF DESCRIPTION OF THE DRAWINGS

Further advantages, features, and details of the present disclosure will emerge from the exemplary embodiments described below and with reference to the drawings, in which, schematically.

Identical, equivalent or functionally identical elements may be provided with the same reference signs in one of the figures or throughout the figures.

DETAILED DESCRIPTION

Figure 1:
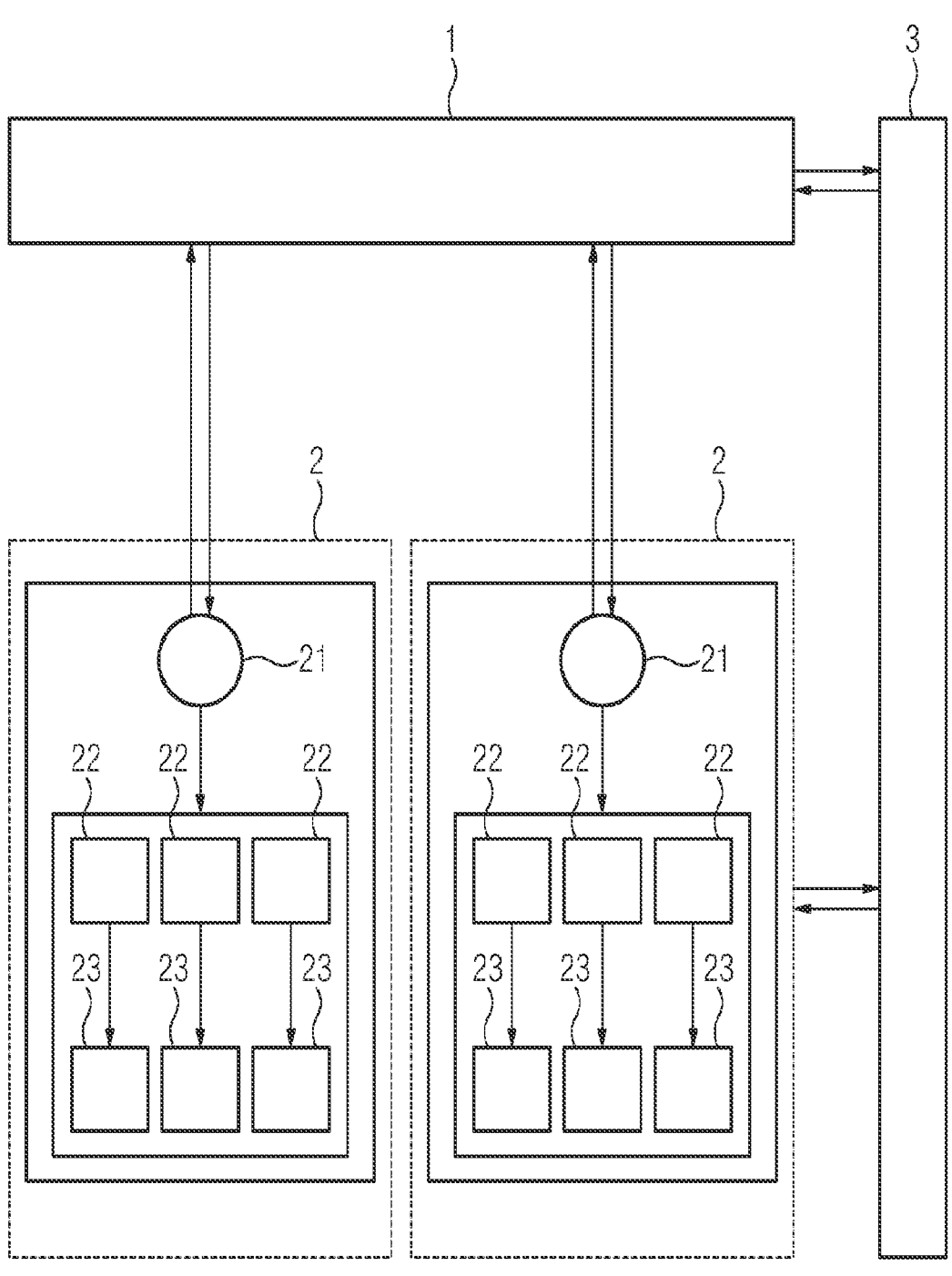
FIG. 1 shows an overview of an example system incorporating teachings of the present disclosure.

The present disclosure teaches systems and/or methods for controlling load flows between multiple energy systems via an electrical grid by means of a control apparatus that is common to the energy systems, wherein each of the energy systems can provide a power, associated with a load flow, at at least one grid node of the electrical grid, in particular on a temporally flexible basis. For example, some embodiments include:

ascertaining first powers scheduled for the load flows on the basis of data transmitted from the energy systems to the control apparatus that include information about a maximum power providable at the respective grid node by the respective energy system;

determining a controlling power that is internal to the electrical grid and resolved with respect to the grid nodes on the basis of the ascertained scheduled first powers and on the basis of grid boundary conditions provided for the electrical grid;

taking account of the controlling power determined at the grid node by appropriately reducing or increasing the maximum powers providable at that grid node by the energy systems;

ascertaining scheduled second powers on the basis of the reduced or increased maximum providable powers; and controlling the load flows according to the ascertained second powers.

In the present disclosure, the term power includes a real power and/or a reactive power. From a structural viewpoint, the IPCC Fifth Assessment Report in particular defines an energy system as: "All components related to the generation, conversion, delivery and use of energy." The energy system is in particular a building, for example an office building and/or a residential building, an industrial plant, a campus, a district, a municipality and/or the like.

The energy system comprises, in particular as power plants, power generators, energy stores, in particular battery stores, combined heat and power generation plants, in particular unit-type district-heating power stations, gas boilers, diesel generators, electric boilers, heat pumps, compression chillers, absorption chillers, pumps, district heating networks, energy transfer lines, wind turbines or wind generators, photovoltaic plants, biomass plants, biogas plants, waste incineration plants, industrial plants, conventional power stations and/or the like, as equipment.

The energy systems are connected to the electrical grid, for example via a respective grid connection point. The electrical grid can be used by the energy systems to exchange energy, or power within a time range. In this case, the arithmetic sign of the power can be used to distinguish a generation from a consumption. A provision of a power or of an energy is understood in the present case to mean an energy generation and/or an energy consumption, this also including energy stores, which when charging feed an energy out of the electrical grid and/or when discharging feed an energy into the electrical grid. In other words, a positive or negative power within a time range is provided, that is to say, in summary, a power is provided. The assignment of the arithmetic sign of the power to energy generation (infeed into the electrical grid) and to energy consumption (outfeed out of the electrical grid) depends on the meter system used.

The control apparatus is an apparatus that is common or central to the energy systems. It is designed to control the energy exchanges or load flows between the energy systems via the electrical grid. No immediate control is required. It is sufficient for the control apparatus to transmit control data scheduled for the control to the respective energy systems. These control data are received for example by edge devices of the energy systems and converted into control signals for the power plants of the respective energy system. There may be provision for direct control of the power plants, however. This means that the power plants of the energy systems that feed energy or power into or out of the electrical grid, and thus, with this in mind, the load flows between the energy systems, are controlled by the central control apparatus. For this purpose, the control apparatus can thus be designed for data interchange with the energy systems.

The electrical grid has multiple grid nodes. The infeed or outfeed by an energy system has an associated grid node. In other words, the positive or negative power of an energy system is provided at a grid node of the electrical grid. The powers provided can be used to ascertain what power flows or is exchanged from one grid node to another grid node of the electrical grid via a line. In other words, this creates the load flows between the energy systems. The (power) control of the power plants or energy systems thus controls the load flows between the energy systems.

In the present disclosure, the terms power and energy are regarded as equivalent and interchangeable, since a power within a time range always has an associated energy.

Some example methods comprise ascertaining the first powers scheduled for the load flows on the basis of data transmitted from the energy systems to the control apparatus that include information about a maximum power providable at the respective grid node by the respective energy system. In other words, the control apparatus computes the first powers on which the actual load flows between the energy systems could be based. This can be regarded as a first prediction or as a first simulation of the load flows. In other words, the control apparatus computes a first prediction for the load flows, that is to say for a future time range, for example for the next 15 minutes. In this case, the first prediction or the first simulation can compute the load flows in such a way that the electrical grid is not overloaded by the load flows. Thus, the first prediction is computed by means of the information about what maximum amount of energy the respective energy system can provide or intends to provide in said time range. In this case, provision can in turn be an infeed or outfeed with respect to the electrical grid. The information about the respective maximum providable amount of energy is transmitted from the energy systems, for example by respective edge devices and/or a control unit or automatic control unit of the power plants, to the control apparatus in advance of the actual power flows.

The transmitted maximum providable powers can be regarded as predictions by the energy systems with regard to their operation. Thus, after this, there is as yet no assurance that the capacity limits of the electrical grid will be sufficient for actual service delivery. A controlling power may thus be required at the grid node, which is ascertained and taken into account in the steps that follow.

The example method may include determining a controlling power that is internal to the electrical grid and resolved with respect to the grid nodes on the basis of the ascertained scheduled first powers and on the basis of grid boundary conditions provided for the electrical grid. For this purpose, the grid boundary conditions of the electrical grid are provided for example by a grid operator of the electrical grid. The ascertainment of the first powers means that the control platform is figuratively aware of what load flow takes place between which grid nodes. The grid boundary conditions provided mean that the electrotechnical boundary conditions for the powers of the electrical grid are known, and so the scheduled first powers and the grid boundary conditions can be used by the control apparatus to ascertain an overload on a line of the electrical grid.

In other words, the control apparatus thus knows what first power is supposed to be exchanged from which grid node to which grid node via which line of the electrical grid and what maximum power (grid boundary conditions) the scheduled line has. A comparison of the maximum powers with the scheduled first powers allows potentially overloaded lines or lines close to their load limit to be ascertained. This knowledge allows the control apparatus to ascertain an internal controlling power (positive or negative) for each grid node participating in the load flows so that the electrical grid is not overloaded by the load flows into one or more areas or operated close to its load limit, for example at more than 80 percent. The grid boundary conditions comprise said respective load limits. This is done for each grid node that is affected by the load flows (and known), that is to say in a manner resolved with focus on the grid nodes.

The example method may further comprise taking account of the controlling power determined at the grid node by appropriately reducing or increasing the maximum powers providable at that grid node by the energy systems. For each participating or loaded grid node, the control apparatus knows what maximum power or amount of energy can be provided at the respective grid node by the respective energy system or its power plants. In other words, it is known which energy system intends to provide what maximum energy/power for the load flows at which grid node. Furthermore, it is known from one of the preceding steps of the method according to the invention what controlling power is required at the respective grid node in order to comply with the grid boundary conditions. There is thus provision to take account of the controlling power by subtracting it from the maximum powers of the energy systems that can be provided at the grid node. Depending on the arithmetic sign of the controlling power and the maximum providable power, the maximum providable power is thus reduced or increased. In other words, this results in the ascertainment of new maximum providable powers corrected for the respective controlling power.

The example method may comprise ascertaining scheduled second powers on the basis of the reduced or increased maximum providable powers. In other words, the first element is carried out again with the control-power-corrected maximum providable powers. It is thus figuratively fictitiously assumed that the energy systems would have transmitted the control-power-corrected maximum providable powers to the control apparatus. As a result, the control apparatus ascertains the load flows between the energy systems as optimally as possible by taking account of the controlling power that is required internally. The ascertainment or computation of the second powers can in turn be regarded as a second prediction for the load flows or a second simulation of the load flows.

The example method may include controlling the load flows according to the ascertained second powers. For example, this is accomplished by virtue of the ascertained second powers being transmitted to the respective energy systems as desired values by the control apparatus. In other words, the information about the scheduled powers (second powers) for the load flows is transmitted to the respective energy systems in the form of data. These can be received by an edge device and/or a control unit of one or more power plants of the respective energy system and converted into control signals of the corresponding power plants of the energy system. The power plants provide the power according to the ascertained second powers for the electrical grid. This accordingly results in the load flows that are controlled according to the second powers. With this in mind, the control apparatus central to the energy systems can control the load flows.

The example method provides dynamic combination of energy exchanges and the provision of reserve power. With this in mind, the electrical grid can therefore be operated more independently of a grid that is superordinate to the electrical grid, since the reserve power required for the operation of the electrical grid is provided internally in the grid as far as possible. This may be particularly advantageous in the case of volatile feeders or generators, for example for photovoltaics and/or wind generators to the electrical grid.

Furthermore, the methods described herein can be carried out dynamically, that is to say at intervals of one day, one hour, 15 minutes and/or 5 minutes. This is possible because, as a result of the transmission of the respective maximum providable amount of energy (or the information about it), the control apparatus knows when which energy system intends to provide, that is to say to feed in or feed out, a power, and where in the grid.

The methods incorporating teachings of the present disclosure are dynamic in the sense that, in contrast to static methods, a defined controlling power is not provided, but rather said controlling power is determined dynamically and according to the transmitted scheduled maximum amounts of energy/powers with focus on the grid nodes. In other words, the controlling power is ascertained and taken into account in an adaptive manner, that is to say according to the scheduled infeed and outfeed, with focus on the grid nodes.

As an example, a control apparatus for controlling load flows between multiple energy systems via an electrical grid comprises a communication unit and a computing unit, wherein the communication unit is designed to receive data that include information about a maximum power providable at the respective grid node by the respective energy system. The control apparatus is characterized in that the computing unit is designed to ascertain first powers scheduled for the load flows on the basis of the received maximum powers providable at the respective grid node;

to determine a controlling power that is internal to the electrical grid and resolved with respect to the grid nodes on the basis of the ascertained scheduled first powers and on the basis of grid boundary conditions provided for the electrical grid;

to take account of the controlling power determined at the grid node by appropriately reducing or increasing the maximum powers providable at that grid node by the energy systems;

to ascertain scheduled second powers on the basis of the reduced or increased maximum providable powers; and to control the load flows according to the ascertained second powers.

In some embodiments, additionally an external controlling power scheduled for an electrical grid that is superordinate to the electrical grid is taken into account according to the internal controlling power. In other words, the electrical grid can by and large provide controlling power (positive or negative) for a grid that is superordinate to said electrical grid. This can also be done with focus on the grid nodes, so that one or more, if necessary different, grid nodes contribute to the external controlling power.

Furthermore, the methods described herein comply with future requirements for electrical grids (known in Germany by the term Redispatch 2.0). The provision of controlling power (flexibility) from the electrical grid for overlaid grid levels or superordinate grids is ensured, while flexibility and energy use in the internal electrical grid is also optimized, in this case by the control apparatus.

In some embodiments, the external controlling power and/or a grid topology is transmitted to the control apparatus by a control unit of the superordinate grid. In other words, the external controlling power and/or the grid topology, which may include the electrical grid and/or the grid that is superordinate thereto, is transmitted to the control apparatus by the grid operator of the superordinate grid. In some embodiments, the grid topology of the electrical grid can be transmitted to the control platform by the grid operator of the electrical grid. This means that the grid boundary conditions and the grid nodes of the control platform are advantageously known.

In some embodiments, the first powers are ascertained by means of a first optimization method on the basis of a first target function by taking account of the grid boundary conditions, the first powers being the variables of the first target function. In other words, a first mathematical optimization is performed to ascertain the first powers. This involves extremizing, that is to say minimizing or maximizing, the first target function, which quantifies a property to be optimized with respect to the load flows. The first powers are the variables of the first target function, and so they are ascertained, or their values are computed, by the extremization of the first target function. The first target function is extremized by taking account of constraints. In the present case, the constraints of the optimization problem include the grid constraints, which means that these are taken into account for the first optimization. In other words, the solution to the first optimization problem, which corresponds to the first powers, recognizes the constraints. The first target function may be the total energy turnover, primary energy input, total carbon dioxide emissions and/or total costs with respect to load flows.

In some embodiments, a sequence of the energy systems, according to which sequence the providable powers at one of the grid nodes are reduced or increased, is stipulated on the basis of the first optimization. In other words, for a grid node, the reserve power ascertained for that grid node can typically be provided by multiple energy systems. To stipulate which energy system is used first or which energy systems are used for the controlling power in the first place, it is possible to determine the contributions that the energy system makes to the result (value of the target function) of the optimization problem. If the target function is minimized, the energy system having the lowest contribution is used first for the controlling power, that is to say said controlling power is subtracted from the maximum providable amount of energy transmitted by said energy system. The energy system having the next highest contribution is then used, creating a sequence of the energy systems that corresponds to the aforementioned sequence until the required controlling power is fully covered. For example, the energy systems are arranged according to their specific carbon dioxide emissions. Furthermore, an arrangement (sequence) of the energy systems according to the specific fees associated with provision of the controlling power (flexibility costs) is possible.

In some embodiments, the second powers are ascertained by means of a second optimization method on the basis of a second target function by taking account of the grid boundary conditions, the second powers being the variables of the second target function. In other words, the second powers, as already preferably the first powers, are ascertained or computed by means of an optimization. The optimizations in this instance can each be regarded as simulations or predictions or forecasts with regard to the load flows, since they each compute the load flows and the associated first or second powers for a future time range within which the load flows then actually take place on the basis of the second powers. In other words, the optimization methods are also simulation methods. The difference between the first powers (first optimization) and second powers (second optimization) is that the second powers take account of the grid-node-resolved controlling power. The above statements about the first optimization can also be used for the second optimization.

In some embodiments, the first and second target functions are the same. In other words, the first and second optimization methods are based on the same target functions. The constraints are fundamentally different, however, since the constraints of the second optimization comprise the maximum providable amounts of energy reduced or increased by the respective controlling power. The constraint of the second optimization thus comprises the maximum providable amounts of energy corrected for the controlling power. The constraint of the first optimization comprises the maximum providable amounts of energy transmitted from the energy systems.

In some embodiments, the grid boundary conditions comprise maximum line capacities for a load flow from one grid node to another grid node. These maximum power capacities (maximum power) or the information about the respective maximum power and/or connection capacities (maximum connected load) can be transmitted to the control platform by the energy systems and taken into account for the optimizations. The first and second powers as solutions of the respective optimization thus recognize the technical boundary conditions characterized by the maximum line or connection capacities.

In some embodiments, the internal controlling power required at a grid node is ascertained from the maximum power capacity by means of a risk factor. The risk factor can also be referred to as the utilization factor of the respective power. This allows identification or ascertainment of when a line is deemed to be loaded. For example, the risk factor is 80 percent of the maximum power capacity. Depending on the utilization level, more or less controlling power is required at the respective grid nodes.

For example, more is supposed to be supplied at a grid node i than consumed. Let us suppose that the grid node i therefore supplies to the grid node j (high consumption) via the line i→j. If this line were thus close to its maximum power capacity (limit capacity), this can be counteracted according to the present invention by additionally feeding in a power (controlling power) at the grid node j, for example, and/or reducing the load. It is thus ascertained for which node there is a need for internal controlling power (flexibility requirement). This can then be computed using said risk factor $\mu$, for example by way of $P_k = \mu \cdot P_{i,j,t,max}$, where $P_{i,j,t,max}$ denotes the maximum power capacity of the line i→j. The risk factor can be stipulated by a grid operator of the electrical grid and transmitted to the control apparatus, for example. The controlling power ascertained by the control apparatus can continue to be transmitted to the grid operator.

In some embodiments, the data transmitted to the control platform comprise information about a maximum connected load of the respective energy systems. This means that the respective maximum connected load (connection capacity) of the energy systems can be taken into account by the control apparatus for the optimizations. The information about the maximum connected loads can be transmitted to the control apparatus together with the information about the respective maximum providable amount of energy.

In some embodiments, the providable powers reduced or increased according to the determined controlling power are associated with a deferrable consumption, a deferrable generation and/or with a provision by an energy store of the respective energy system. This can prevent nondeferrable powers from being used for the controlling power. If the respective energy systems transmit a flag of their respective scheduled maximum providable amount of energy as deferrable or nondeferrable, the control apparatus can preferably take account of the deferrable powers within the optimizations for providing the controlling power. In other words, the energy systems can transmit information about deferrable, for example within a respective time range, scheduled powers/amounts of energy to the control apparatus. In some embodiments, the deferrable powers are taken into account for providing the reserve power.

In some embodiments, the control apparatus is used to control the load flows within a local energy market. This allows controlling power to be taken into account within a local energy market. The control apparatus and/or one of its embodiments may be particularly suitable for the operation of local energy markets, since it facilitates grid-internal regulation of the electrical grid by means of the ascertained controlling power provided by the energy systems, essentially independently of a superordinate grid. Within the context of a local energy market, the energy systems can additionally provide information about a specific fee (fee per kilowatt hour) for the scheduled maximum providable amount of energy. Thus, within the context of a local energy market, the transmitted data can also be referred to or regarded as an offer or bid.

If the control apparatus is used for a local energy market, the target functions are preferably the total costs associated with the load flows, said costs being created from the first or second power (variables) and the respective associated fee.

In some embodiments, the control apparatus forms a local energy market platform. The control apparatus may preferably be cloud-based.

In some embodiments, the method is carried out for a coming day, in particular for the next day. Particularly with regard to a local energy market, this allows day-ahead trading taking into account reserve power.

In some embodiments, the method is carried out repeatedly in time periods of one day, one hour, 15 minutes and/or 5 minutes. Particularly with regard to a local energy market, this allows intra-day trading taking into account reserve power.

FIG. 1 schematically shows an example system incorporating teachings of the present disclosure. The complete system shown comprises at least two energy systems 2, for example two buildings, a control apparatus 1 central to the energy systems 2 and a control unit 3 of an electrical grid.

The energy systems 2 can exchange energy or power via the electrical grid. These load flows are controlled between the energy systems 2 by the control apparatus 1. For this purpose, data or information can be interchanged between the energy systems 2 and the control apparatus 1, between the control apparatus 1 and the control unit 3 of the electrical grid, and between the energy systems 2 and the control unit 3 of the electrical grid. These data interchanges are symbolized in FIG. 1 by the respective arrows.

The energy systems 2 each comprise an edge device, which facilitates the data interchange and thus the communication with the control apparatus 1. Furthermore, the edge devices can be designed to communicate with the control unit of the electrical grid 4 and thus with the grid operator.

The edge devices are designed to receive and additionally process data for controlling power plants 23 of the respective energy system from the control apparatus 1. The edge devices 21 transfer these received and optionally processed data to the control unit 22 of the respective power plants 23. As a result, the power plants 23 are controlled according to the data transmitted to the edge devices 21 by the control apparatus 1. Since the power plants 23 eventually provide a power for the electrical grid via the grid connection point of the associated energy system 2, the load flows between the energy systems 2 are thus controlled by the central control apparatus 1. For example, the edge devices 23 are in the form of an energy management apparatus. The edge devices 23 further form a communication interface to the control apparatus 1.

The control apparatus 1 is in the form of a local energy market platform. Within the context of a local energy market, offers or bids for the powers/amounts of energy that the respective energy system intends to contribute to one or more of the load flows are transmitted to the local energy market platform 1 by the edge devices 23. To control the load flows, the control apparatus 1 or the local energy market platform 1 thus figuratively collects the bids of all participating energy systems 2. With this in mind, the energy systems 2 can also be referred to as participants.

Furthermore, grid boundary conditions and further requirements of the electrical grid, for example its grid topology and reserve power requirements external to the electrical grid (external flexibility requirements or requirements of superordinate grids or higher grid levels), are transmitted to the control apparatus 1 by the control unit 3.

The energy systems 2 can comprise energy subsystems, which are then treated as energy systems in the spirit of the present invention or one of its embodiments.

Figure 2:
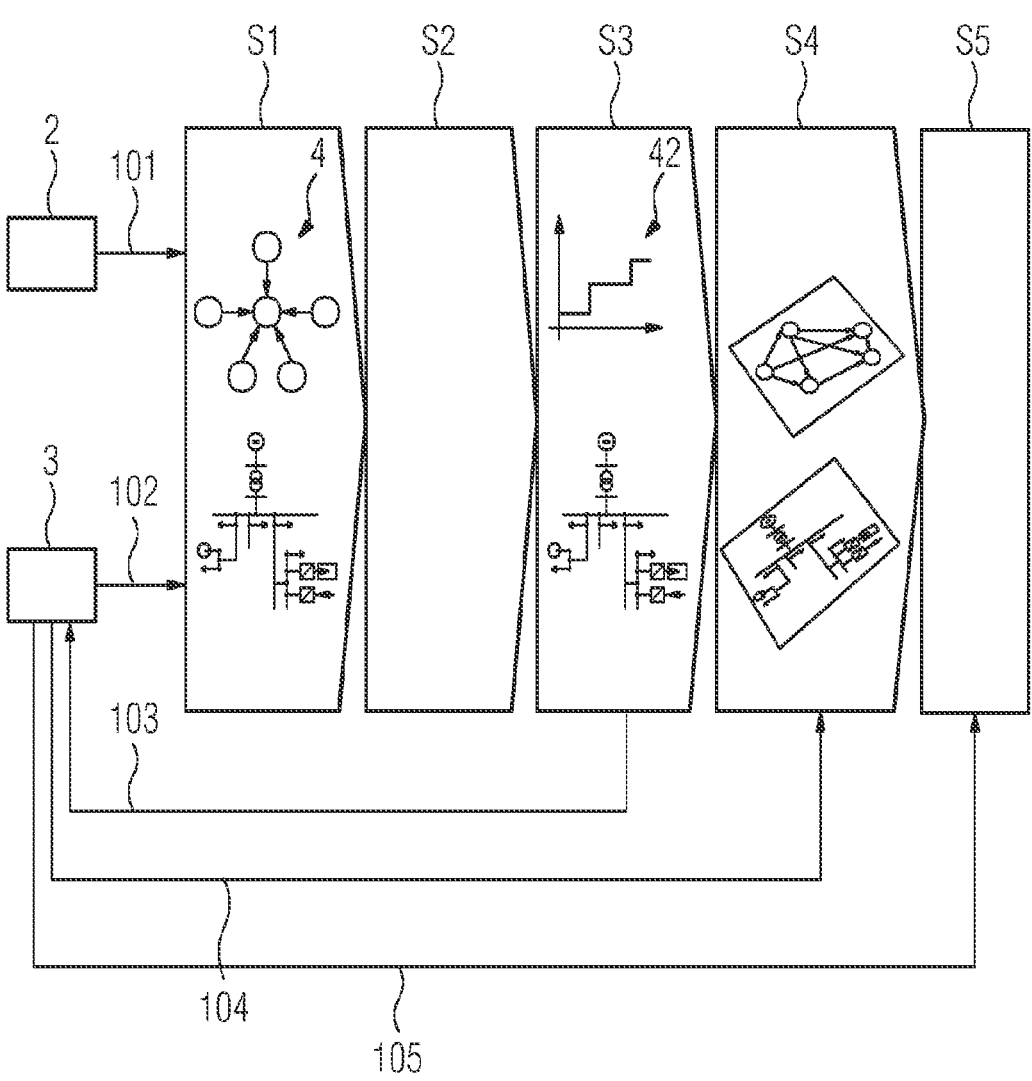
FIG. 2 shows a flowchart of an example method for controlling load flows incorporating teachings of the present disclosure.

FIG. 2 shows a flowchart of an example method incorporating teachings of the present invention. In the embodiment that follows, the method or control apparatus 1 is used to control load flows between multiple energy systems 2 within the context of a local energy market. In this instance, the control apparatus 1 may be configured as a local energy market platform.

The energy systems 2 form the participants in the spirit of a local energy market, that is to say they intend to participate in one of the load flows. The load flows are again exchanged via an electrical grid to which the energy systems 2 are connected.

Furthermore, a control unit 3 of a grid operator of the electrical grid is involved in the method, with the result that the control unit can interchange data or information with the control apparatus 1 and the energy systems 2. The data interchanges or information interchanges are identified by the arrows 101, . . . , 105.

The method shown comprises at least S1, . . . , S5. In the present case, steps S1, . . . , S5 are carried out by the control apparatus 1. In other words, the control apparatus 1 is designed to carry out steps S1, . . . , S5.

In a step prior to steps S1, . . . , S5, the energy systems 2 transmit information about their maximum providable amount of energy $$E_{max,t}^B$$

[kWh] or power, information about an associated minimum or maximum fee $$c_{min/max,t}^B$$

[fee/kWh] and, in addition, an associated maximum connected load to the control apparatus 1. This can be done for a scheduled time or time range t. A maximum fee is transmitted for a consumption and a minimum fee is transmitted for a generation. Moveable types of generation and consumption can also be identified or transmitted as moveable. In summary, these data/this information transmitted to the control apparatus 1 can be regarded as a bid or offer for the participation of the respective energy system 2 in one of the load flows.

In particular with regard to deferrable powers, a distinction can be drawn between three offers (flexibility offers). A first flexibility offer is identified by a deferrable consumption for a time range. In this case, a maximum amount of energy to be obtained, an optionally time-dependent connected load and a maximum fee for the consumption are transmitted to the control apparatus 1 for said time range in the form of data/information.

A second flexibility offer is identified by a deferrable generation for a time range. In this case, a maximum amount of energy to be generated, an optionally time-dependent connected load and a minimum fee for the generation are transmitted to the control apparatus 1 for said time range in the form of data/information.

A third flexibility offer is identified by the use of an energy store of one of the energy systems 2 for a time range. In this case, a maximum storage capacity, a maximum charging power and minimum discharge power of the energy store (optionally time-dependent), a charging and discharge efficiency (optionally time-dependent) and a minimum fee for the use of the energy store are transmitted to the control apparatus 1 for said time range in the form of data/information.

In summary, a maximum providable power/amount of energy is transmitted to the control apparatus 1 for a scheduled time range at least by each participating energy system.

S1 comprises the control apparatus 1 ascertaining the first powers scheduled for the load flows on the basis of data/offers transmitted from the energy systems 2 to the control apparatus 1 that include the information about a maximum power providable at the respective grid node by the respective energy system 2. The transmission of said data is identified by the arrow 101.

The scheduled first powers are ascertained by means 28 a thermal optimization. The optimization or the optimization problem is preferably based on a target function in the form:

$$\sum_{t,n,k} P_{t,n,k}^B \cdot c_{min,t,k}^B - P_{t,n,k}^A \cdot c_{max,t,n,k}^A + P_{dch,t,n,k}^{BAT} \cdot c_{dch,min,t,n,k}^{BAT} + P_{i,j,t}^G \cdot c_{fees,i,j,t}^G,$$

where $$P_{t,n,k}^B$$

is the first power (variable) to be ascertained for a scheduled transmitted consumption (English: bid) and $$c_{min,t,k}^B$$

is an associated transmitted minimum fee, $$P_{t,n,k}^A$$

is the first power (variable) to be ascertained for a scheduled transmitted consumption (English: ask) and $$c^A_{max,t,n,k}$$

is the associated maximum fee, $$P^{BAT}_{dch,t,n,k}$$

(English: discharge/charge; abbreviated to dch/ch) is the first power (variable) for a scheduled and transmitted use of an energy store and $$c^{BAT}_{dch,min,t,n,k}$$

is an associated minimum fee for the use of the energy store, in particular a battery store. The flowing power i→j scheduled via a line is denoted by $$P^G_{i,j,t},$$

there likewise being able to be provision for a fee $$c^G_{fees,i,j,t}$$

(grid fee) for this.

In other words, $$P^{x=A,B,BAT}_{t,n,k}$$

are the decision variables (variables) determined by means of the first optimization. The variables correspond to the scheduled first powers of the subscriber k, at the grid node n at the time t or within the time range identified by t. In addition, in the present case a power associated with a generation is given a positive value and a power associated with a consumption is given a negative value within the target function, the target function or the value thereof being minimized in the present case. This determines the variables $$P^{x=A,B,BAT}_{t,n,k},$$

or the values thereof, that correspond to the first powers.

Furthermore, the optimization problem has the following constraints:

$$\sum_k P^B_{t,n,k} - \sum_k P^A_{t,n,k} + \sum_i P^G_{i,k,t} + \sum_k P^{BAT}_{ch,t,n,k} - \sum_k P^{BAT}_{dch,t,n,k} = 0,$$

for all grid nodes n and times t within a time range T.

In addition, the constraints $$P^B_{t,n,k} \le P^B_{max,t,n,k}$$

and $$P^A_{t,n,k} \le P^A_{max,t,n,k}$$

are used. In this case, $$P^{A,B}_{max,t,n,k}$$

correspond to the respective maximum providable powers transmitted to the control apparatus 1 from the energy systems 2, or, within a time interval Δt, to the respective maximum providable energies transmitted. This means that these transmitted data are taken into account for the optimization.

For energy stores (flexibility of the first type), the further constraint $$E^{BAT}_t = E^{BAT}_{t-1} + P^{BAT}_{ch,t} \cdot \eta_{ch} - \frac{1}{\eta_{dch}} P^{BAT}_{dch,t},$$

is used, this being shown without indices for grid nodes and subscribers for reasons of clarity.

Moveable loads (flexibility of the second type for moveable consumption or moveable generation) are identified by the constraint:

$$\sum_{t_{start}}^{t_{end}} P^{A,B}_{t,n,k} \cdot \Delta t \le E^{A,B}_{max,n,k},$$

For a line flow or load flow from one grid node i to another grid node j of the electrical grid, the grid boundary conditions $P_{i,j} = -P_{j,i}$ and $P_{i,j} \le P_{i,j,t,max}$ are required. In this case, $P_{i,j,t,max}$ can be transmitted to the control apparatus 1 by the energy systems 2 and/or by a grid operator of the electrical grid 4, for example by a control unit 3 of the electrical grid 4, and/or can be ascertained by a grid model that is known to the control apparatus 1. The transmission of the grid boundary conditions of the electrical grid 4 by the control unit 3 of the electrical grid 4 is symbolized by the arrow 102.

S2 comprises determining a controlling power that is internal to the electrical grid and resolved with respect to the grid nodes on the basis of the ascertained scheduled first powers and on the basis of grid boundary conditions provided for the electrical grid 4. In other words, the second step 2 ascertains the flexibility requirement of the electrical grid 4 for the scheduled first powers for each of the grid nodes. In other words, after the first step S1, which was used to compute the first powers on the basis of the transmitted data/bids, it is clear what power should flow via which line and which grid nodes, and so the knowledge of the grid boundary conditions (maximum power capacity) means that it is clear whether a line is overloaded by the scheduled load flow that corresponds to the associated first power. In this case, a line can be identified as overloaded from as early as 80 percent of its maximum utilization level.

In other words, S2 comprises computing which grid nodes or which lines are expected to be operated close to their capacity limit. Since the result of the first optimization problem (first powers) is based on predictions by the individual energy systems 2 or participants (transmitted maximum providable amount of energy/power), there is no assurance of whether the capacity limits are sufficient for actual service delivery. Heavily utilized lines, for example $P_{i,j,t} \leq \alpha^* P_{i,j,t,max}$, with $0 \leq \alpha \leq 1$, indicate an internal flexibility requirement within the grid area considered for the electrical grid 4. The internal flexibility requirement (controlling power) can result from the control apparatus 1 and/or the control unit 3 of the electrical grid 4, that is to say from the grid operator.

Furthermore, there may be provision for a risk factor μ for determining the controlling power or the flexibility requirement, that is to say this controlling power P is determined according to $P_{Flex,k} = \mu \cdot P_{i,j,t,max}$, for example with $\mu = 0.2$.

S3 comprises taking account of the controlling power determined at the grid node by appropriately reducing or increasing the maximum powers providable at that grid node by the energy systems 2. In other words, the maximum providable powers/energies that were transmitted from the energy systems 2 to the control apparatus 1 and on which the first optimization problem was based are corrected by the required reserve power ascertained in the second step S3. A portion of the maximum powers providable by the energy systems 2 is thus scheduled as reserve power. For example, a scheduled consumption at one grid node is reduced and/or a scheduled infeed at one grid node is increased. These figuratively fictitious maximum providable powers corrected for the controlling power are subsequently used for a second optimization. In other words, instead of the transmitted maximum providable powers that were used in the first optimization to determine the required controlling power, the second optimization involves using the maximum providable powers corrected for the required controlling power.

The determined controlling power can be transferred to the energy systems 2 according to a stipulated and/or ascertained sequence 42 in the spirit of the above. In other words, it is ascertained which energy system 2 makes what contribution to a controlling power required and determined at a grid node. This sequence is symbolized in the figure by the graph in step S3, where for example the controlling power in kilowatt hours (kWh) on the abscissa of the graph and the fees of the energy systems 2 associated with the provision of the respective controlling power on the ordinate are connected. In other words, the energy systems 2 can be arranged in respect of their fees for providing the controlling power or in respect of their carbon dioxide emissions for providing the controlling power (sequence 42). Within the context of a local energy market, knowledge of the transmitted data, for example in the form of bids, can thus be taken by the control apparatus 1 of the local energy market as a basis for ascertaining a grid-node-focused or grid-node-resolved fee function or carbon dioxide emission function for providing the controlling power, the energy systems 2 or their associated power plants being organized in ascending order according to their fees or their carbon dioxide emissions for providing the controlling power or the flexibility requirement (sequence 42). The determined flexibility requirement and optionally the fee function or the carbon dioxide emission function can be transmitted from the control apparatus 1 to the control unit 3 of the electrical grid 4. This is identified by the arrow 103.

S4 comprises ascertaining scheduled second powers on the basis of the reduced or increased maximum providable powers by means of the second optimization. This involves using the same target function for the first optimization. For the second optimization, however, it is not the transmitted maximum providable powers/amounts of energy $$P_{max,t,n,k}^{A,B}$$

or $$E_{max,t,n,k}^{A,B}$$

that are used as a constraint in the form $$P_{t,n,k}^{A,B} \Delta t \leq E_{max,t,n,k}^{A,B},$$

but rather the providable powers/amounts of energy $$\hat{P}_{max,t,n,k}^{A,B}$$

or $$\hat{E}_{max,t,n,k}^{A,B}$$

that have been corrected for the controlling power. As a result, the internal controlling power requirement is taken into account for the second optimization. Furthermore, an external controlling power requirement of a grid that is superordinate to the electrical grid 4 can additionally be taken into account. In this case, the control unit 3 of the electrical grid 4 can stipulate what internal and/or external controlling power requirement is actually taken into account. In particular, the external controlling power requirement is stipulated by the control unit 3 of the electrical grid and transmitted to the control apparatus 1 for consideration. This is symbolized by the arrow 104.

S5 comprises controlling the load flows between the energy systems 2 or between the power plants of the energy systems 2 according to the ascertained second powers. This ensures that the ascertained internal controlling power requirement and optionally additionally the external controlling power requirement are provided by the actual load flows, for example the next day (symbolized by the arrow 105). In this case, it is first possible to check which power plant is connected to which grid node. It can then be established whether the respective power plant is ready for use or available. The ready-for-use or available power plants are then prioritized according to the ascertained sequence 42 and controlled by local control units in such a way that they deliver the power according to their associated and ascertained second power in the scheduled time range. If an error is detected within said procedure, the method can be repeated, optionally taking account of present measured values or amounts of energy already provided (realtime optimization).

Within the context of a local energy market, the example method thus allows electrical energy to be traded in a manner corrected for the technically required reserve power.

Although the invention has been described and illustrated in more detail by way of the preferred exemplary embodiments, the invention is not restricted by the disclosed examples, or other variations may be derived therefrom by a person skilled in the art without departing from the scope of protection of the disclosure.

LIST OF REFERENCE SIGNS

1 Control apparatus
2 Energy system
3 Control unit
4 Electrical grid
21 Edge device
22 Control device
23 Plant
42 Sequence
101 Arrow
102 Arrow
103 Arrow
104 Arrow
105 Arrow
S1 First step
S2 Second step
S3 Third step
S4 Fourth step
S5 Fifth step

What is claimed is:

1. A method for controlling load flows between multiple energy systems via an electrical grid using a control apparatus common to the energy systems, wherein each of the energy systems can provide a power associated with a load flow at at least one grid node of the electrical grid, the method comprising:

ascertaining first powers scheduled for the load flows on the basis of data transmitted from the energy systems to the control apparatus, the data including information about a maximum power providable at the respective grid node by the respective energy system;

determining an internal controlling power to the electrical grid and resolved with respect to the grid nodes on the basis of the ascertained scheduled first powers and on the basis of grid boundary conditions provided for the electrical grid;

taking account of the controlling power determined at the grid node by appropriately reducing or increasing the maximum powers providable at that grid node by the energy systems;

ascertaining scheduled second powers on the basis of the reduced or increased maximum providable powers; and controlling the load flows according to the ascertained second powers;

wherein the second powers are ascertained with a second optimization method on the basis of a second target function by taking account of the grid boundary conditions, the second powers comprising variables of the second target function.

2. The method as claimed in claim 1, further comprising adjusting the internal controlling power based on an external controlling power scheduled for an electrical grid that is superordinate to the electrical grid.

3. The method as claimed in claim 2, further comprising transmitting the external controlling power and/or a grid topology to the control apparatus using a control unit of the superordinate grid.

4. The method as claimed in claim 1, further comprising ascertaining the first powers using a first optimization method on the basis of a first target function by taking account of the grid boundary conditions, the first powers comprising variables of the first target function.

5. The method as claimed in claim 4, further comprising stipulating a sequence of the energy systems, according to which sequence the providable powers at one of the grid nodes are reduced or increased, on the basis of the first optimization.

6. The method as claimed in claim 1, wherein the grid boundary conditions comprise maximum line capacities for a load flow from one grid node to another grid node.

7. The method as claimed in claim 6, wherein the internal controlling power required at a grid node is ascertained from the maximum power capacity by means of a risk factor.

8. The method as claimed in claim 1, wherein the data include information about a maximum connected load of the respective energy systems.

9. The method as claimed in claim 1, wherein the providable powers reduced or increased according to the determined controlling power are associated with a deferrable consumption, a deferrable generation and/or with a provision by an energy store of the respective energy system.

10. The method as claimed in claim 1, further comprising using the control apparatus to control the load flows within a local energy market.

11. The method as claimed in claim 1, wherein the method is carried out for a day in future.

12. The method as claimed in claim 1, wherein the method is carried out repeatedly in time periods.

13. A control apparatus for controlling load flows between multiple energy systems via an electrical grid, the apparatus comprising:

a communication unit; and a computing unit;

wherein the communication unit is designed to receive data including information about a maximum power providable at the respective grid node by the respective energy system; and the computing unit is designed:

to ascertain first powers scheduled for the load flows on the basis of the received maximum powers providable at the respective grid node;

to determine a controlling power that is internal to the electrical grid and resolved with respect to the grid nodes on the basis of the ascertained scheduled first powers and on the basis of grid boundary conditions provided for the electrical grid;

to take account of the controlling power determined at the grid node by appropriately reducing or increasing the maximum powers providable at that grid node by the energy systems;

to ascertain scheduled second powers on the basis of the reduced or increased maximum providable powers; and to control the load flows according to the ascertained second powers;

wherein the second powers are ascertained with a second optimization method on the basis of a second target function by taking account of the grid boundary conditions, the second powers comprising variables of the second target function.

14. The control apparatus as claimed in claim 13, further comprising a local energy market platform.

* * * * *